Dec. 21, 1965  R. A. LE MASSENA  3,224,436
HYPODERMIC APPARATUS FOR MEASURING HYDROGEN
ION CONCENTRATION OF BLOOD WITHIN
A LIVING BODY
Filed April 10, 1961  4 Sheets-Sheet 1

*INVENTOR.*
Robert A. Le Massena

ATTORNEY.

Dec. 21, 1965          R. A. LE MASSENA            3,224,436
      HYPODERMIC APPARATUS FOR MEASURING HYDROGEN
            ION CONCENTRATION OF BLOOD WITHIN
                      A LIVING BODY
Filed April 10, 1961                       4 Sheets-Sheet 2

INVENTOR.
Robert A. Le Massena

BY Arthur H. Swanson

ATTORNEY

INVENTOR.
Robert A. Le Massena
ATTORNEY.

United States Patent Office 3,224,436
Patented Dec. 21, 1965

3,224,436
HYPODERMIC APPARATUS FOR MEASURING HYDROGEN ION CONCENTRATION OF BLOOD WITHIN A LIVING BODY
Robert A. Le Massena, Denver, Colo., assignor to Minneapolis-Honeywell Regulator Company, Minneapolis, Minn., a corporation of Delaware
Filed Apr. 10, 1961, Ser. No. 101,797
13 Claims. (Cl. 128—2.1)

The present invention relates generally to apparatus for measuring the value of an electrochemical characteristic of a biological substance. More specifically, the invention relates to electrodes or electrode assemblies for use in the measurement of the value of such a characteristic in situ and in vivo: that is, in the natural location of the biological substance within a living body.

A general object of the present invention is to provide improved apparatus for use in the measurement of the value of an electrochemical characteristic of a biological fluid in vivo and in situ. A specific object of the invention is to provide such improved apparatus comprising novel forms of electrodes of electrode assemblies for use in the measurement of the hydrogen ion concentration, or pH, of blood in situ within a living animal body.

A more specific object of the present invention is to provide novel electrode assemblies of the foregoing type which are arranged to contact the blood in vivo in situ, and which permit the measurement of the pH of the blood to be effected without requiring the removal of the blood from its natural location or path of flow within the body.

It is well known that there are many situations in medical and surgical practice in which there is a need for the measurement of the value of the pH of blood. Although certain of these situations require merely the routine laboratory sample type of blood pH measurement, there are numerous situations in which accurate pH measurements must be made repeatedly, and often continuously and concurrently with the progress of an operation or other event involving an animal body. Certain of these situations require the continuous accurate measurement of both the magnitude and the frequency of occurrence of the rapid fluctuations in the pH of the flowing blood which are present in such situations. The requirements of such situations dictate that the pH measurement be made in vivo, and preferably in situ.

In an attempt to fill these needs, several methods and arrangements have been proposed which are intended to make it possible to obtain the needed blood pH readings. However, all of these previously known techniques of which I am aware have fallen short of providing a practical solution to the problem, since they all are characterized by defects which prevent them from producing the necessary measurements.

A first defect of the know arrangements is that none of them permits the pH measurements to be made under normal or natural conditions, since they all require either that the blood be taken out of its natural place or environment in order that the pH measurements be performed, and hence do not give in situ measurements, or that the necessary electrodes be surgically implanted within the portion of the body, such as an artery, in which the pH of the blood is to be measured, thereby disturbing the normal functioning of the body. This characteristic defect of the known arrangements, of causing the pH measurements to be made under other than normal body conditions, is a practically important fault, since the pH measurements obtained under such abnormal conditions are known to be subject to unpredictable inaccuracies.

Specifically with the first mentioned or cell type of the known arrangements, the blood to be measured must be placed in a test container or cell, and must thus be removed from the body either permanently or at least temporarily, or must be circulated from the body through the test cell and then returned to the body. All of the forms of this type of the known arrangements obivosuly cause the pH measurements to be made on blood which is not in its natural environment, and hence to be made under abnormal condition. Also, with the other of the aforementioned types of the known arrangements, the necessary surgical introduction and presence of the electrodes in the body disturbs the normal functioning thereof and hence causes the pH measurements to be made under abnormal conditions. In each case, inaccurate, and hence unsatisfactory, measurements are the result.

A second defect of the known arrangements lies in the fact that their very natures are such as to preclude their use in many instances. Obviously, it is not possible to use the sampling type of procedure where the continuous measurement of rapid pH changes is required, nor is it possible in many cases to perform the surgery required for the known in situ procedures.

A third common and significant fault shared by the known blood pH measuring methods and devices is their inability to measure the blood pH continuously for any extended period of time. This inability appears to be due to the formation by the blood of a protein film on the pH electrodes. This film increases continually, and finally completely inhibits the pH sensitivity of the electrodes. Since many situations require that the blood pH be accurately measured continuously for extended periods, this shortcoming of the known arrangements is indeed a serious one. The previously suggested use of anticoagulants to be added to the blood stream for the purpose of inhibiting the formation of this desensitizing film has not proved to be of any practical value, since the conditions in many situations prohibit the use of anticoagulants.

All in all, the foregoing several shortcomings of all the previously known blood pH measuring procedures and arrangements have made them incapable of measuring blood pH accurately under the prevailing conditions, and hence have made it impossible to obtain the needed pH measurements in many situations where such measurements would have been of great value. Accordingly, there has been a definite need for improved pH electrode assemblies which can contact the blood directly in its normal location, in a living artery or vein, for example, without disturbing the normal functioning of the body or being adversely affected by the presence of the blood, and which can thus be subjected continually to the changing pH of the blood as it flows over its normal course in its normal environment, to the end of continuously providing the needed accurate measurement of the blood pH and the changes occuring therein.

It is noted in this connection that it has also been proposed in the past to insert delicate, minute electrodes enclosed in glass micropipettes into plant cells, and to insert capillary glass electrodes into animal tissue, in order to measure conditions within these media. Such procedures require the exercise of micro-techniques and extremely careful and accurate manipulation, due to the necessarily small size and fragility of the elements employed, and hence are entirely impractical for other than laboratory use on controlled bodies under ideal conditions. Such procedures are obviously entirely impractical for the measurement under clinical or other practical conditions of a characteristic of blood flowing in a living animal body.

Accordingly, there has been a definite need for improved blood pH electrode assemblies which are designed not only to be able to contact the blood directly and continuously in a living blood stream without producing any mutually adverse effects, but also to have the necessary ruggedness and size so as to be practically usable on living bodies under the normal clinical and other conditions encountered in practice. Moreover, such assemblies, to be practically usable, must additionally be of such form and size as to embody other essential characteristics, such as freedom from injuring or affecting the body when being applied thereto, and the capability of being sterilized.

In the copending application of H. J. Hroch von Dalebor, Serial No. 101,946, filed on even date herewith, there are disclosed and claimed novel pH electrode assemblies which embody the foregoing required characteristics and thus are designed to meet the foregoing needs. It is a prime object of the present invention, however, to provide novel pH electrode assemblies which represent practically significant improvements over the assemblies of said copending application, to the end of being very simple and rugged in construction, and of a form which is highly efficient in operation and is quite practical to fabricate.

To the end of fulfilling the foregoing object, as well as those set forth hereinbefore, the two necessary pH electrodes of each of the novel electrode assemblies according to the present invention are designed and arranged to fit within the bore of a hypodermic needle forming part of the assembly. Moreover, each of these electrodes is of a novel design and includes a novel metallic electrode member portion which lies wholly within the confines of the needle. These improvements provide a novel construction which is simple, rugged, efficient, and readily fabricated.

The needle of each of the assemblies according to the present invention is provided with apertures through which the blood contacts the two pH electrodes when the assembly is in use. Thus, by the simple act of inserting this needle into the artery or other place wherein the blood pH is to be measured, the pH electrodes are effectively brought directly into contact with the blood in situ, and the desired pH measurements can be obtained under natural conditions and without disturbing the normal functioning of the body.

In one of the forms of such novel electrode assemblies according to the present invention, the two pH electrodes lie side by side within the needle. In another form, these electrodes lie coaxially within the needle, thus permitting the use of a needle of very small diameter. Further, in each form according to the invention, adverse effects on the electrodes by the blood are prevented by the use of suitable electrode coatings. Thus, each of the novel electrode assemblies according to the invention is one which imbodies the above-stated essential characteristics for permitting continuous, accurate, in vivo and in situ blood pH measurement, and at the same time is one which is of such construction as to be entirely practical to make and use.

A better understanding of the present invention may be had from the following detailed description of apparatus embodying the invention, which description is to be read in connection with the accompanying drawings, wherein.

Figures 1, 7, 8:
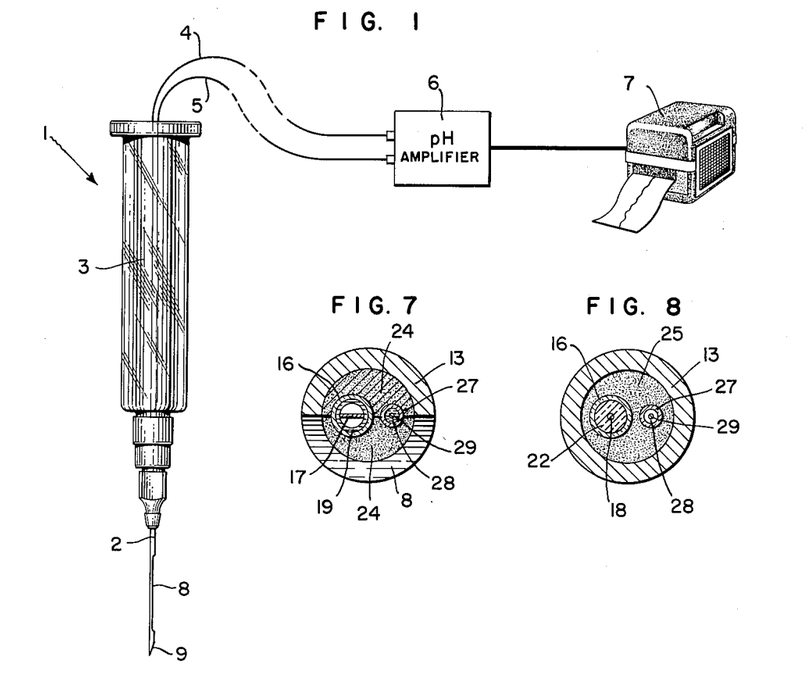
FIG. 1 is a general side view of a preferred form of blood pH electrode assembly according to the present invention, showing the connection of the assembly to the usual pH amplifying and displaying means.
FIG. 7 is a cross-sectional view of the needle and electrodes of FIG. 4 taken along the line 7—7 of that figure.
FIG. 8 is a cross-sectional view of the needle and electrodes of FIG. 4 taken along the line 8—8 of that figure.

In FIG. 1, there is shown a general view of a novel blood pH electrode assembly 1 which embodies the present invention and which thus includes an apertured hypodermic needle 2 in which the pH electrodes are located. As shown, the assembly 1 also includes a barrel portion 3 which supports and carries the needle 2. For convenience of construction and use, this barrel portion 3 may well be, and is shown herein as being, the usual syringe barrel which would usually be combined with a hypodermic needle to form the usual hypodermic syringe. However, in the practice of the present invention, in accordance with an important and novel feature thereof, the barrel and needle combination is not used as a syringe at all. Instead, the barrel 3 serves only to support and carry the needle 2, while the latter, which is modified in accordance with the invention, serves as means for placing the pH electrodes in a living body to permit in situ pH measurements to be made. The needle 2 also serves, of course, to support and protect the pH electrodes.

The FIG. 1 electrode assembly also includes output leads or conductors 4 and 5, which are shown in FIG. 1 as being connected to the usual pH amplifier 6. The latter, in turn, is shown as being connected to a suitable recording instrument 7. This instrument may well be, and is shown in FIG. 1 as being, an oscillographic recorder of the direct writing type as made and sold by the Heiland Division of the Minneapolis-Honeywell Regulator Company. Since the deails of such a recorder are shown and desccribed in the Heiland Patent No. 2,580,427, for example, and form no part of the present invention, they are not repeated herein.

Further, in accordance with the invention, the needle 2 is provided with an elongated aperture or window 8 and an end opening 9 through which the blood or other fluid contacts the pH electrodes within the needle when the latter has been inserted into an artery or other place within a body. As will be explained in more detail hereinafter, this action results in the production between the conductors 4 and 5 of an electrical signal of a value dependent upon that of the pH of the fluid to which the electrodes within the needle 2 are exposed. In the usual manner, this electrical value is amplifier by the device 6, and is recorded as a pH value by the recorder 7.

*The electrode assembly of FIGS. 2–9*

The details of a preferred, parallel electrode form which the assembly 1 may take are shown in FIGS. 2 through 9. As is clear from these figures, this form of the assembly 1 includes the needle 2, the barrel 3, and pH electrodes to be described in detail hereinafter.

In these figures, only a part of the barrel 3 is shown: namely, the lower part which supports the needle 2. This is all of the barrel 3 that it is necessary to show in these figures, however, since the remainder of the barrel 3 of the assembly of FIGS. 2 through 9 is merely that of the usual syringe barrel as shown in FIG. 1.

Figure 2:
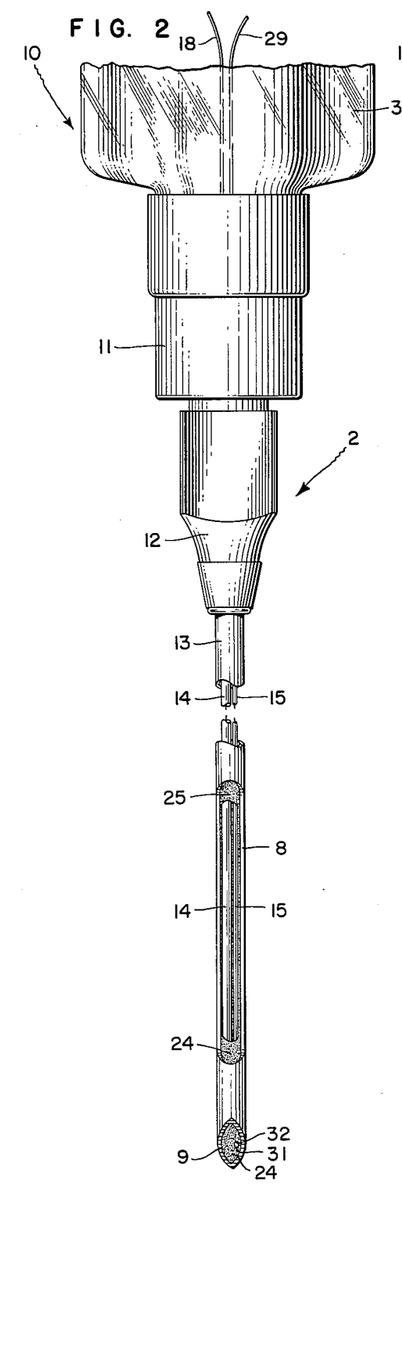
FIG. 2 is an enlarged front view of the lower, needle and electrode portion of a specific parallel electrode from which the assembly shown generally in FIG. 1 may take.
Figure 3:
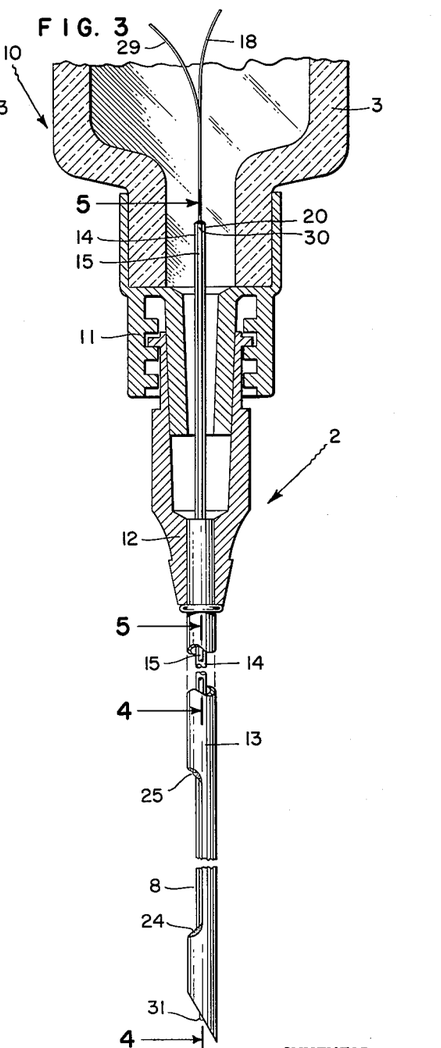
FIG. 3 is a side view, partly in section, of the needle and electrode portion of FIG. 2.

FIGS 2 and 3 show the lower portion of the assembly of FIGS. 2 through 9, which portion is designated by the reference character 10 and includes the lower end of the barrel 3 and the needle 2 containing the pH electrodes. As shown in FIGS. 2 and 3, the barrel 3 terminates in the usual needle-supporting sleeve 11, while the needle 2 consists of the usual hub and flange portion 12 and shank portion 13. The latter is provided with the window 8 and the end opening 9. The barrel sleeve 11 and the needle hub and flange portion 12 cooperate to secure the needle 2 to the barrel 3 in the usual manner. If a smaller assembly is desired, the sleeve 11 can be omitted and the needle hub 12 attached directly to the lower end of the barrel 3.

As is necessary for the measurement of pH, the assembly of FIGS. 2 through 9 includes two pH electrodes which constitute a so-called electrode pair. In accordance with the present invention, these electrodes lie within the needle 2, and, in the form of the invention now being described, lie parallel within the needle. One of the electrodes of this pair is a so-called glass electrode, and is designated by the reference character 14. The other electrode is a so-called reference electrode, and is designated by the reference character 15. Each of these electrodes is of a novel form in accordance with the present invention, and consists of a number of portions as will now be explained.

*The glass electrode 14*

Figure 4:
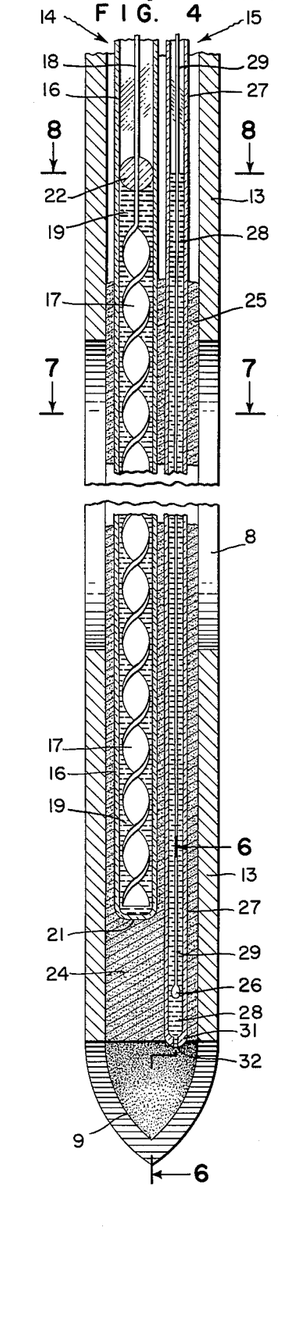
FIG. 4 is an enlarged sectional front view of the lower portion of the needle and electrodes of FIG. 3 taken along the line 4—4 of that figure.
Figures 5, 6:
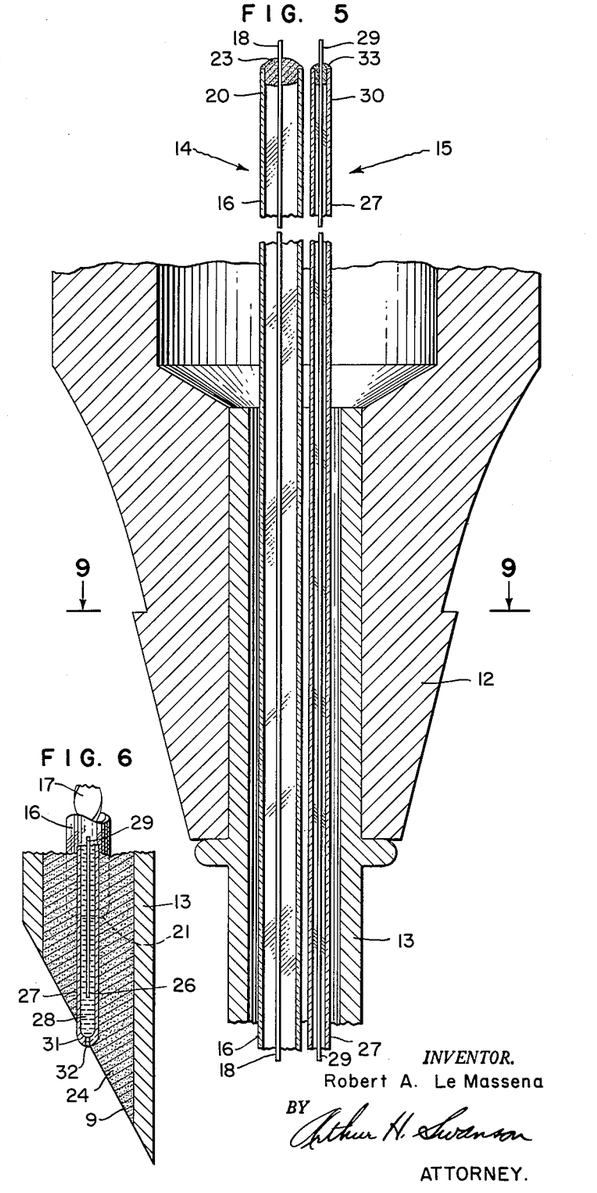
FIG. 5 is an enlarged sectional front view of an upper part of the portion of FIG. 3 taken along the line 5—5 of that figure.
FIG. 6 is a sectional side view of the lower end of the needle and electrodes of FIG. 4 taken along the line 6—6 of that figure.

As best seen from FIGS. 4 and 5, the novel glass electrode 14 consists of a tube 16 of pH-sensitive glass, an internal reference electrode member 17 in the form of a spiral ribbon, a lead wire 18 connected to the electrode member 17, an electrically conductive liquid fill 19, and various seals and coatings to be described. As shown in FIGS. 3 through 6, the tube 16, and hence the entire glass electrode 14, extends from an upper end 20, located adjacent the lower end of the barrel 3, downward through the bore of the needle 2 to a lower, sealed-off end 21 therein. As best seen from FIGS. 4 and 6, this lower end 21 of the tube 16 lies within the needle bore adjacent the lower, pointed end or trip of the needle shank 13. Thus, the tube 16 extends above and somewhat below the needle wall opening or window 8, through which a portion of the outer surface of the tube 16 is exposed to the exterior of the needle.

The electrode member 17 lies and is supported within the bore of the pH-sensitive glass tube 16. Specifically, the electrode 17 extends from a lower end, adjacent the lower, closed tube end 21, to an upper end adjacent a supporting seal or bead 22 located in the tube 16 somewhat above the upper margin of the window 8. Thus, the whole of the electrode 17 is contained within the tube 16 within the bore of the needle shank 13, with a portion of the electrode 17 lying in an exposed sensing portion of the tube 16 beneath the window 8 as best seen from FIGS. 4 and 7.

Figure 9:
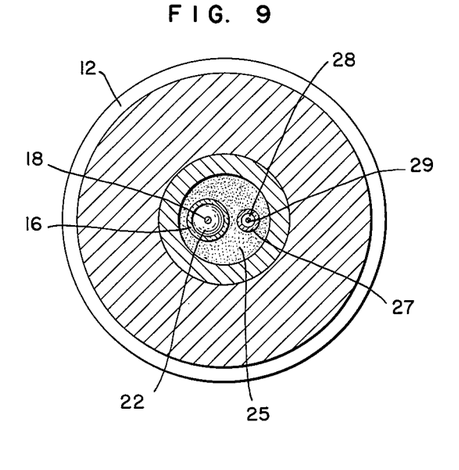
FIG. 9 is a cross-sectional view of the FIG. 5 portion taken along the line 9—9 of that figure.

In practice, the electrode member 17 is desirably formed by flattening and then twisting a wire of suitable material. An upper, unflattened portion of this wire then forms the lead wire 18 which, as shown in FIGS. 4 and 8, passes through the seal 22 and thus supports the member 17 within the tube 16. As shown in FIGS. 5 and 9, the lead wire 18 extends upward from the seal 22 within the bore of the tube 16 to the upper end 20 of this tube. At this point, the lead 18 passes through an upper end glass-metal or inert cement seal 23 for the tube 16, and hence passes out of this tube and into the barrel 3. The lead 18 is then connected within the barrel 3 by suitable means, not shown, to the lead 4.

The liquid 19 fills the tube 16 approximately up to the seal 22. Therefore, the electrode member 17 is completely immersed in this liquid. The latter, being an electrical conductor, thus forms an electrical connection between the member 17 and the interior of the wall of the tube 16. The significance of this will become apparent as the following description of the glass electrode 14 progresses.

The pH-sensitive glass tube 16 is provided with a suitable electrically insulating coating, not shown, which extends over the entire outer surface of the tube 16 except for the said exposed portion of this surface which lies within the window 8. Accordingly, this uncoated, uninsulated area of the tube 16 is the active sensing portion of the tube 16, and hence of the entire glass electrode 14. Thus, when the needle 2 is surrounded by a fluid, as occurs when the assembly is in use, the uncoated, exposed sensing surface of the tube 16 is in contact with the fluid by virtue of the window 8, whereby a portion of the pH measuring circuit or electrode chain is established. This portion can be traced from the surrounding fluid through the exposed wall of the tube 16 to the liquid fill 19, and through the latter to the internal reference electrode member 17. In this electrode chain, the exposed wall of the tube 16 forms a pH-sensitive glass membrane, in the known manner for glass pH electrodes.

The aforementioned insulating coating on the non-sensing portion of the tube 16 is necessary in order to prevent creeping currents, which would tend to cause unsteady and erroneous pH measurements, and in order to increase the electrical resistance ratio between the sensing and non-sensing portions of the tube 16 to the high value needed for consistent and accurate pH measurements. Additionally, in order to insure the presence of a high degree of electrical insulation between the tube 16 and the needle 2, the interior of the latter is also coated with the same material employed as the coating on the tube 16.

Further, the space between the tube 16 and the interior wall of the needle bore, except for the space occupied by the reference electrode 15 to be described hereinafter, is filled and sealed with this same electrically insulating coating material. Therefore, the tube 16 is supported within the needle bore by this fill of the coating material. As shown in FIGS. 2, 3, 4, and 6, the portion of this fill below the window 8 has been identified in the drawings by the reference character 24, and fills the needle bore around the tube 16 from the end opening 9 up to the lower margin of the window 8. Similarily, an upper portion 25 of this insulating fill extends upwardly from the upper margin of the window 8 and supports the tube 16 within the needle bore above the window 8. In addition to supporting the tube 16 within the needle bore, the insulating fill also serves to seal off the bore of the needle from liquids which would otherwise enter at the window 8 and end opening 9 when the assembly is in use. Additionally, this fill prevents any of the surrounding fluid from penetrating between the back wall of the needle adjacent the window 8 and the tube 16, where any such fluid would tend to influence the measured pH and thus would tend to cause inertia in the response to changing pH of the exposed, sensing surface of the tube 16.

*The reference electrode 15*

The novel reference electrode 15 is actually a combination of a so-called external reference electrode member 26 and a so-called salt bridge which extends between the member 26 and the fluid whose pH is to be measured. This salt bridge portion of the reference electrode 15 includes a glass bridge tube 27 located within the bore of the needle shank 13 parallel to the glass electrode tube 16, and supported within the needle bore by the aforementioned insulating fill. The tube 27 also serves to house and support the electrode member 26. The salt bridge portion of the electrode 15 also includes a suitable salt bridge liquid fill 28 for the tube 27. The electrode 15 also includes a lead wire 29 connected to the member 26, and a coating and seal to be described hereinafter.

The bridge tube 27, and hence the entire reference electrode 15, extends from an upper end 30, located adjacent the lower end of the barrel 3, downward through the bore of the needle 2 to a lower end 31 just outside the lower margin of the fill 24 at the needle end opening 9. The tube end 31 is provided with a very small end or tip opening 32 in register with the needle end opening 9, as best seen in FIGS. 2, 4, and 6.

The electrode member 26 is attached to the lower end of the lead 29 within the tube 27, and is supported adjacent the tip opening 32 by the lead 29. If desired, the member 26 may simply be a prepared portion of the lead 29. The latter extends upward within the bore of the tube 27 to the upper end 30 thereof, at which point the lead 29 passes through a glass-metal or inert cement end seal 33 for the tube 27, and hence passes out of this tube and into the barrel 3. It is in this manner that the electrode member 26 is supported within the tube 27.

Within the barrel 3, the lead 29 is connected by suitable means, not shown, to the lead 5. The leads 4 and 5 may well be coaxial cables, with their central conductors connected to the respective leads 18 and 29. Instead, if desired, the leads 4 and 5 can be in the form of a single coaxial cable having its outer conductor connected to the lead 29 and its central conductor connected to the lead 18.

The liquid 28 fills the bridge tube 27 up to approximately the same level as that for the liquid 19 in the tube 16. The liquid 28 thus surrounds and contacts the member 26, and also extends down within the tip opening 32, forming a liquid junction with the fluid surrounding the needle. Therefore, the liquid 28 of the salt bridge actually bridges the small distance between the electrode member 26 and the surrounding fluid whose pH is to be measured. The pH electrode chain established by the reference electrode 15 can thus be traced from the surrounding fluid to the liquid fill 28 through the tip opening 32, and through the liquid 28 to the external reference electrode member 26. In this electrode chain, the liquid 28 serves the usual purpose which salt bridge solutions serve in the making of pH measurements.

*pH Electrode anticoagulation coating*

In order to permit the foregoing electrode assembly to be used to make in vivo and in situ blood pH measurements continuously over extended periods of time without requiring the undesirable procedure of introducing an anticoagulant into the blood stream, the exposed portions of the pH electrode tubes 16 and 27 are coated with a substance which prevents the formation on said exposed portions of the aforementioned protein film. As noted previously herein, and as explained in said co-pending application, such a film builds up on such exposed electrode portions and renders them inoperative unless a coating of the type described herein and in said copending application is present on the exposed electrode surfaces. In the case of the tube 16, the film would completely destroy the pH sensitivty of this tube, while in the case of the tube 27, this film would block the opening 32 and hence interrupt the salt bridge.

In order that the above coating will serve its stated purpose and at the same time will be practically usable, the material used as the coating must have several characteristics. In the first place, this material must, of course, prevent, or at least inhibit for long periods, the formation of the aforementioned protein film. Secondly, it must not inhibit or in any way change undesirably the pH sensitivity of the electrodes. Additionally, it must not be toxic when in contact with blood. Finally, its application to the electrodes surfaces must be readily and practically accomplishable, and must not involve the use of temperatures which would be harmful to the electrodes.

As explained in said copending application, there are several materials which have been found to embody the several foregoing essential characteristics, and hence which have been found to be suitable for use as pH electrode coatings for the above purpose. One of these is a chlorosilane known as Silgon Glass Glaze. Another is a water soluble silicone concentrate known as Siliclad. Still another is a resin known as Kel-F 800. The Silgon Glass Glaze has been found to be the most suitable material for use as the pH electrode coating, since a coating of this material has been found to enhnace materially the pH response of the glass electrode 14, while at the same time meeting all of the foregoing essential requirements for such a coating.

As mentioned above, the described coating is applied to the exposed portions of the pH electrode tubes 16 and 27. Specifically, this coating is applied to the sensing surface of the tube 16 which is exposed through the needle window 8, and to the exposed part of the tube 27 which projects from the fill 24 in the opening 9 at the end of the needle. The presence of this coating makes it possible to make continual blood pH measurements in vivo without the introduction of any anticoagulants into the blood stream.

*Operation of the assembly of FIGS. 2–9*

In use, the needle 2 is inserted into the artery or other body portion wherein the pH of the blood or other body fluid is to be measured. Thereupon, the fluid contacts, through the window 8, the exposed portion of the surface of the pH-sensitive glass tube portion 16 of the glass electrode 14. At the same time, the fluid contacts the salt bridge liquid portion 28 of the reference electrode 15 through the tip opening 32 in the tube portion 27 of that electrode, which portion extends from the opening 9 in the needle 2. Therefore, when the needle 2 is in use, the blood or other body fluid directly contacts in situ the two electrodes 14 and 15 which are in the bore of the needle shank 13, this contacting taking place through the window 8 and the end opening 9 provided in the needle 2. Under these conditions, the glass electrode 14 and the reference electrode 15, and hence the internal reference electrode member 17 and the external reference electrode member 26, cooperate in the usual manner for a pH electrode pair to produce between the conductors 18 and 29, and hence between the respective leads 4 and 5, an electrical signal of a value dependent upon that of the pH of the surrounding fluid. The value of this signal is then recorded and displayed by the instrument 7 as the desired pH value of said fluid.

It should be readily apparent that the novel forms which the foregoing electrodes have according to the present invention result in an electrode assembly which is of simple construction, which is practical to fabricate and manufacture, which is convenient to use, which is sufficiently rugged for its intended purpose, and which is capable of producing the desired pH signals. For example, the illustrated use of long tubes for the electrodes provides desirably long paths between the liquid surfaces and the glass-metal seals, thereby preventing the heat inherent in the making of such seals from adversely affecting the liquids. This facilitates the fabrication of the electrodes, as does the use of but a single tube for each electrode.

Further, the novel form of the electrodes and of the assembly is one which results in desirably short paths between the metallic electrode members and the fluid whose pH is to be measured. This improves the operating efficiency of the assembly, as does the use of the flattened, spiraled internal reference electrode member of large surface area. Additionally, this novel form provides electrodes which are of sufficient sturdiness to facilitate their construction and incorporation in the electrode assembly, and to facilitate the use and maintenance of the assembly. It should be clear also, therefore, that this assembly embodies all of the necessary characteristics and features set forth hereinbefore, and hence meets and fulfills the several needs and objects enumerated above.

Typical characteristics

By way of illustration and example, and not by way of limitation, the following table lists a set of related typical characteristics, such as materials and dimensions, which the various portions of an actual assembly of the form of the assembly of FIGS. 2 through 9 may have in practice.

| Ref. No. | Item | Typical Material, Type, etc. | Typical Size, etc. |
| --- | --- | --- | --- |
| 2 | Needle | Hypodermic | 16 gauge. |
| 3 | Barrel | Hypodermic | 1 cc. |
| 8 | Window | | Length: 0.7 in. Depth: Needle radius. |
| 16 | pH sensitive tube | Corning 015 glass | Length: 2.4 in. O.D.: 0.024 in. I.D.: 0.016 in. |
| 17 | Int. ref. electrode member. | Pt, Ag plated, Converted to AgCl. | Length: 1.2 in. Width: 0.016 in. Thickness: 0.002 in. Pitch: 0.16 in. |
| 18 | Lead wire | Pt | Diam.: 0.006 in. |
| 19 | Liquid fill | HCl | 0.1 N. |
| 22 | Seal | Inert cement | |
| 24, 25 | Insulating fill (also coating on tube 16). | Silicone rubber, e.g., Dow Corning "Silastic" #731. | |
| 26 | Ext. ref. electrode member. | Same as for member 17. | |
| 27 | Bridge tube | Flint glass | Length: 2.4 in. O.D.: 0.015 in. I.D.: 0.009 in. |
| 28 | Liquid fill | KCl in agar | Saturated. |
| 29 | Lead wire | Pt | Diam.: 0.006 in. |
| 32 | Tip opening | | Diam.: 0.001 in. |
| None | Anticoag. coating | Silgon Glass Glaze. | |

The electrode assembly of FIGS. 10–13

In the parallel form of electrode assembly just described, the tube portions 16 and 27 of the respective electrodes 14 and 15 lie side by side within the bore of the needle 2. In FIGS. 10 through 13, there is illustrated an alternate form of electrode assembly according to the present invention. In this form, the tube portions of the two pH electrodes of the assembly lie coaxially within the associated needle, thereby permitting the use of a needle of very small diameter. In FIGS. 10 through 13, portions which are the same as those in FIGS. 1 through 9 bear the same reference characters as their FIGS. 1 through 9 counterparts.

Figures 10, 12, 13:
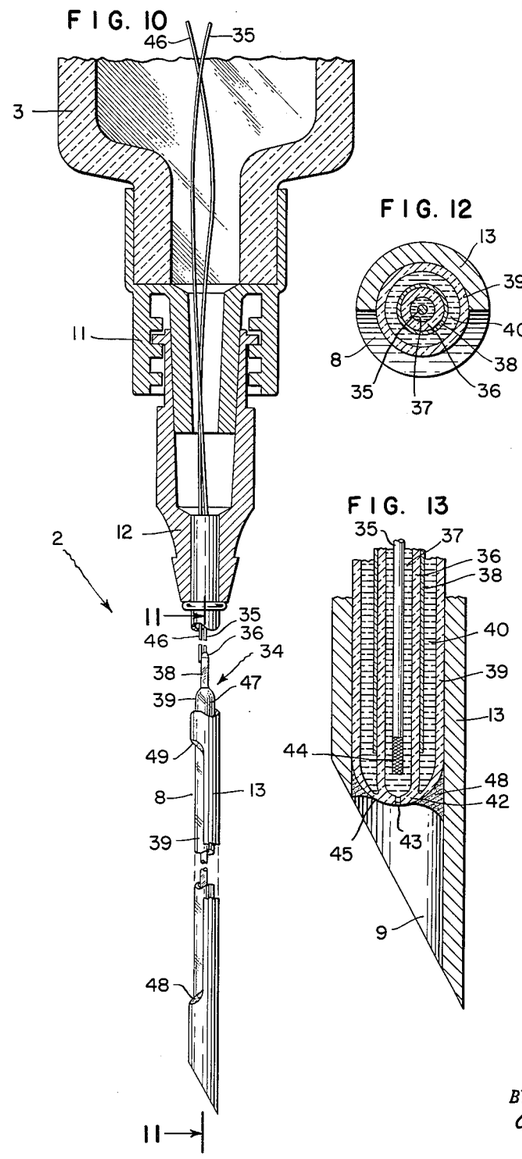
FIG. 10 is an enlarged side view, partly in section, of the lower, needle and electrode portion of a specific coaxial electrode form which the assembly shown generally in FIG. 1 may take.
FIG. 12 is a cross-sectional view of the needle and electrodes of FIG. 11 taken along the line 12—12 of that figure.
FIG. 13 is a sectional side view of the lower end of the needle and electrodes of FIG. 11 taken along the line 13—13 of that figure.
Figure 11:
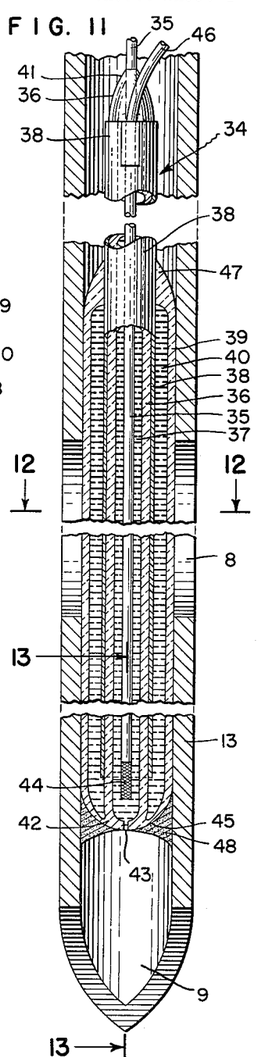
FIG. 11 is an enlarged sectional front view of the needle and electrodes of FIG. 10 taken along the line 11—11 of that figure.

The assembly of FIGS. 10 through 13 includes the needle 2, with the openings 8 and 9 and the shank portion 13, the needle-supporting barrel 3, only partially shown, and the external leads 4 and 5, as shown in FIG. 1, all substantially as for the assembly of FIGS. 2 through 9. The assembly of FIGS. 10 through 13 also includes, in lieu of the separate electrodes 14 and 15, a pH electrode pair in the form of a novel coaxial electrode package or unit 34. As shown in FIGS. 10 and 11, the electrode unit 34 lies and is supported entirely within the bore of the lower portion of the needle shank 13, and has a portion of its outer surface exposed through the window 8. The unit 34 comprises a glass electrode portion surrounding a reference electrode portion. The several elements of the unit 34 which make up each of these two electrode portions or electrodes will now be described.

As best seen in FIGS. 11 and 12, the electrode unit 34 includes, reading from the center outward, a central, circular wire 35, a glass tube 36 coaxially surrounding the wire 35 and containing an electrically conductive liquid fill 37 in which the wire 35 is immersed, a coating 38 on the exterior surface of the tube 36, and an outer glass tube 39 coaxially surrounding the tube 36 and containing an electrically conductive liquid fill 40 in which the tube 36 and its coating 38 are immersed.

The nature and purpose of each of these elements will now be described.

The reference electrode

The reference electrode of the unit 34 includes the wire 35, the tube 36, the liquid fill 37, and several other portions to be described below. The tube 36 is a salt bridge tube, and is sealed at its upper end 41 to the wire 35 by a glass-metal seal. At its lower end or tip 42, the tube 36 is provided with a very small end or tip opening 43, in register with the needle end opening 9.

The wire 35 terminates at a lower end within the tube 36 adjacent the tip opening 43. This lower end of the wire 35 is provided with a suitable coating which is shown extending up the wire for a short distance. If desired, this coating may extend further up the length of the wire 35 within the tube 36. This coating forms an external reference electrode member 44 in the tube 36. The wire 35 not only supports this coating electrode member 44, but also forms a lead which extends upward through the tube 36 and out of the latter through the seal at the upper tube end 41. From there, the wire 35 extends up through the remainder of the needle bore into the barrel 3, as shown in FIG. 10, for connection therein to the lead 5 by suitable means, not shown.

The liquid 37 is a salt bridge liquid which fills the tube 36 and thus surrounds and contacts the electrode member 44. The liquid 37 also extends down within the tip opening 43, thus forming a liquid junction with the fluid surrounding the needle 2 when the assembly is in use. Therefore, the liquid 37 actually bridges the small distance between the electrode member 44 and the surrounding fluid whose pH is to be measured. The pH electrode chain established by the reference electrode can thus be traced from the surrounding fluid to the liquid 37 through the tip opening 43, and through the liquid 37 to the electrode member 44.

The glass electrode

The glass electrode of the unit 34 includes the outer glass tube 39, the coating 38 carried by the tube 36, the liquid fill 40, and several other portions to be described below. The tube 39 is made of pH-sensitive glass, and is sealed at its lower end 45 with a glass-glass seal to the lower end 42 of the tube 36, adjacent the tip opening 43. The coating 38, lying within the tube 39 and carried by the tube 36, forms an internal reference electrode member for the glass electrode, and extends upward within the tube 39 from a point adjacent the lower ends of the tubes 36 and 39 to a point adjacent the upper end 41 of the tube 36. At the last mentioned point, a lead wire 46 is attached to the coating electrode member 38. This wire 46 extends upward through the remainder of the needle bore into the barrel 3, for connection therein to the lead 4 by suitable means, not shown. As before, a single coaxial cable may form the leads 4 and 5 if desired.

The upper end 47 of the pH-sensitive tube 39 is sealed by a glass-metal seal to the coating 38 at a point below the upper margin of the latter. Accordingly, the interior of the tube 39 constitutes a closed chamber having the coating or internal reference electrode member 38 as its inner wall.

The liquid 40 fills the above mentioned chamber within the tube 39, and thus surrounds and contacts the coating electrode member 38. In order to permit the liquid 40 to be placed within the tube 39, the wall of the latter is provided with a sealable opening, not shown. The liquid 40, being an electrical conductor, thus forms an electrical connection between the member 38 and the interior of the wall of the tube 39. As for the assembly of FIGS. 2 through 9, a portion of the outer surface of this wall is exposed to the exterior of the needle through the window 8, this exposed portion being the active, pH sensing portion of the tube 39 and the glass electrode.

Thus, when the assembly is in use, an electrode chain is formed which extends from the surrounding fluid through the exposed wall of the tube 39 to the liquid fill 40, and through the latter to the internal reference electrode 38. As a result, the operation of the assembly of FIGS. 10 through 13 is essentially as described hereinbefore.

Seals and coatings

As for the assembly of FIGS. 2 through 9, the inner surface of the needle bore and the outer surface of the pH sensitive tube 39, except for the exposed sensing portion of this tube surface lying within the needle window 8, are provided with a suitable electrically insulating coating, not shown. Further, a sealing fill of this coating material is provided to seal off any space between the needle bore and the outer surface of the tube 39, and to secure the electrode unit 34 within the needle bore, as is done in the assembly of FIGS. 2 through 9. A lower portion of this fill, corresponding to the portion 24 in FIGS. 2 through 9, is shown at 48 in FIGS. 10, 11, and 13. The tip 42 of the bridge tube 36, containing the opening 43, appears through the lower margin of this lower fill portion 48 as in the case of the assembly of FIGS. 2 through 9. An upper portion of this sealing fill, corresponding to the portion 25 in FIGS. 2 through 9, is shown at 49 in FIG. 10.

Again as for the assembly of FIGS. 2 through 9, the exposed portion of the surface of the tube 39 in the window 8, and the exposed portions of the lower ends of the tubes 36 and 39 at the needle end opening 9, are coated to prevent protein film formation thereon as explained hereinbefore.

Typical characteristics

By way of illustration and example, and not by way of limitation, the following are typical characteristics which various portions of an actual assembly of the form of the assembly of FIGS. 10 through 13 may have in practice:

| | |
|---|---|
| Needle 2 | 19 gauge. |
| Barrel 3 | 1 cc. syringe. |
| Wire 35 | Pt. |
| Salt bridge liquid 37 | Sat. KCl in agar. |
| Coating 38 | Ag converted to AgCl over Pt. |
| pH-sens. tube 39 | Corning 015 glass. |
| Liquid fill 40 | 0.1N HCl. |
| Coating 44 | Ag converted to AgCl. |
| Lead wire 46 | Pt. |
| Insulating fill and coating | Silicone rubber. |
| Anticoag. coating | Silgon glass glaze. |

It should be readily apparent that the concentric electrode assembly just described is a novel one which, like the assembly of FIGS. 2 through 9, embodies the several necessary characteristics and meets and fulfills the several needs and objects enumerated hereinbefore. Additionally, it should be apparent that the coaxial relationship of the electrode unit 34 within the bore of the needle 2 makes it possible to effect a substantial and advantageous reduction in the size of the needle required to house the electrodes. Moreover, this novel electrode unit 34 makes possible an assembly which is simpler, more rugged, and more easily fabricated.

Summary

It is readily apparent in the light of the foregoing description that the present invention provides a novel electrode assembly which consists of novel pH electrodes located within a hypodermic needle and so coated as to provide continuous measurements of blood pH in vivo and in situ over extended periods of time without requiring the introduction of anticoagulants into the blood stream. Moreover, it is also readily apparent that this novel assembly, in each of its forms, embodies the following characteristics which are essential for the successful and practical making of such measurements:

(1) The assembly is convenient to use and to maintain.

(2) The assembly is sufficiently rugged to permit its successful use under practical working conditions.

(3) The use of the assembly involves a minimum of discomfort and injury to the body, and a minimum of interference with the normal functioning of the body.

(4) In use, the pH electrodes contact the blood in situ.

(5) The electrodes exposed to the blood are not adversely affected thereby over extended periods.

(6) The assembly is of simple form, is highly efficient, and is practical to make.

Subject-matter disclosed but not claimed herein is disclosed and claimed in the aforementioned copending application of H. J. Hroch von Dalebor.

What is claimed is:

1. A pH electrode assembly comprising a hypodermic needle having an axial bore and an open, pointed end, a glass pH electrode disposed within said needle bore and having a tube portion terminating in said bore adjacent said needle end, an elongated window through the wall of said needle extending from adjacent said needle end parallel to the axis of said needle, a section of said tube portion which is in register with said window being arranged to constitute a pH-sensitive membrane, a reference electrode disposed within said needle bore and having a tube portion terminating at said open end of said needle and having a relatively small end opening in register with said open end of said needle, a separate electrode member individual to each of said electrodes, located within the corresponding one of said tube portions entirely within said needle bore, and provided with an electrical lead connection, an electrically conductive substance in said tube portion of said glass electrode bridging between the corresponding one of said electrode members and said pH-sensitive membrane section, and an electrically conductive substance in said tube portion of said reference electrode bridging between the corresponding one of said electrode members and said end opening of the last mentioned tube portion.

2. An assembly as specified in claim 1, wherein said two tube portions lie side-by-side within said needle bore beneath said window.

3. An assembly as specified in claim 1, wherein said two tube portions lie coaxially within said needle bore, with the first mentioned one of said tube portions surrounding the other.

4. A pH electrode assembly comprising a hypodermic needle having an axial bore and an open, pointed end, a glass pH electrode disposed within said needle bore and having a tube portion of pH-sensitive glass terminating therein adjacent said needle end, an elongated window through the wall of said needle extending from adjacent said needle end parallel to the axis of said needle and exposing a section of said tube portion which is in register with said window, an electrically insulating coating on the exterior surface of said tube portion except for said exposed section thereof, whereby said section constitutes a pH-sensitive membrane, a reference electrode disposed within said needle bore and having a tube portion terminating at said open end of said needle and having a relatively small end opening in register with said open end of said needle, a separate electrode member individual to each of said electrodes, located within the corresponding one of said tube portions entirely within said needle bore, and provided with an electrical lead connection, an electrically conductive substance in said tube portion of said glass electrode bridging between the corresponding one of said electrode members and said pH-sensitive membrane section, and an electrically conductive substance in said tube portion of said reference electrode bridging between the corresponding one of said electrode members and said end opening of the last mentioned tube portion.

5. An assembly as specified in claim 4, including a coating of a chlorosilane on the surface of at least said pH-sensitive membrane section of the first mentioned tube portion.

6. A pH electrode assembly comprising a hypodermic needle having an axial bore, an elongated, longitudinal wall aperture, an open, pointed end, and an opposite end, means supporting said needle at said opposite end thereof, a glass pH electrode having a small diameter tube of pH-sensitive glass extending within said bore from a first closed end adjacent said opposite needle end to a second closed end within said bore adjacent said open needle end, having an electrically insulating coating on the exterior surface of said tube except for a section of said surface exposed to the exterior of said needle through said wall aperture, having an internal reference electrode member disposed within said tube entirely within said bore, having an electrical lead connected to said member and extending out of said tube at said first end thereof, and having an electrically conductive substance contained in said tube and bridging between said member and the interior surface of said tube adjacent said exposed surface section thereof, and a reference electrode having a small diameter bridge tube extending within said bore substantially parallel to said glass tube from a first closed end adjacent said opposite needle end to a second end at said open needle end, said second end of said bridge tube being provided with a relatively small end opening in register with said open needle end, having an external reference electrode member disposed within said bridge tube adjacent said second end thereof and entirely within said bore, having an electrical lead connected to the last mentioned member and extending out of said bridge tube at said first end thereof, and having an electrically conductive substance contained in said bridge tube and bridging between said last mentioned member and said end opening in said bridge tube.

7. An assembly as specified in claim 6, wherein at least a portion of said internal reference electrode member in said glass tube is in register with said needle wall aperture.

8. An assembly as specified in claim 6, wherein said internal reference electrode member within said glass tube is in the form of a spiral ribbon, at least a portion of which is in register with said needle wall aperture.

9. An assembly as specified in claim 6, wherein said external reference electrode member lies in its entirety within that portion of said bridge tube which extends between said open needle and the adjacent end of said aperture.

10. An assembly as specified in claim 6, wherein said electrically conductive substances within said glass and said bridge tubes fill solely those portions of said tubes which extend from the vicinity of said aperture to said open needle end, said substances being spaced from the ends of said tubes which are adjacent said opposite needle end.

11. A pH electrode assembly comprising a hypodermic needle having an axial bore, an elongated, longitudinal wall aperture, an open, pointed end, and an opposite end, means supporting said needle at said opposite end thereof, and a pH electrode pair unit disposed coaxially entirely within said bore in the vicinity of said aperture, said unit including a central wire extending coaxially within said bore from an end at a point in said bore adjacent said open needle end, and thence extending out of said opposite needle end, a bridge tube of electrically insulating material coaxially surrounding said wire and radially spaced therefrom and extending from a first end outside of and adjacent said wire end and adjacent said open needle end to a second end within said bore, said bridge tube having a relatively small end opening at its said first end in register with said open needle end and being sealed at its said second end to the outer surface of said wire, a coating on at least a portion of the surface of said wire adjacent its said end forming an external reference electrode member, a salt bridge substance contained within said bridge tube, surrounding said wire and said coating thereon, and extending within said end opening of said bridge tube, a pH-sensitive glass tube coaxially surrounding said bridge tube and radially spaced therefrom and extending from a first closed end adjacent said open needle end to a second closed end within said bore, said end opening of said bridge tube opening externally of said first closed end of said sensitive tube, a portion of the outer surface of said sensitive tube being exposed to the exterior of said needle through said aperture therein, a coating on the outer surface of said bridge tube within said sensitive tube forming an internal reference electrode member, an electrical lead electrically connected to the last mentioned coating and extending out of said opposite needle end, and an electrically conductive substance contained within said sensitive tube, surrounding said last mentioned coating, and contacting the interior of said sensitive tube beneath said aperture.

12. An assembly as specified in claim 11, wherein all of said outer surface of said sensitive tube except for said portion of said outer surface is coated with an electrically insulating material.

13. A coaxial pH electrode pair unit comprising a central wire having first and second ends, a bridge tube of electrically insulating material coaxially surrounding said wire and radially spaced therefrom and extending from a first end outside of and adjacent said first wire end to a second end short of said second wire end, said bridge tube having a relatively small end opening at its said first end and being sealed at its said second end to the outer surface of said wire, a coating on at least a portion of the surface of said wire adjacent its said first end forming an external reference electrode member, a salt bridge substance contained within said bridge tube, surrounding said wire and said coating thereon, and extending within said end opening of said bridge tube, a pH sensitive glass tube coaxially surrounding said bridge tube and radially spaced therefrom and extending from a first closed end adjacent said first end of said bridge tube to a second closed end short of said second end of said bridge tube, said end opening of said bridge tube opening externally of said first closed end of said sensitive tube, a coating on the outer surface of said bridge tube within said sensitive tube forming an internal reference electrode member, an electrical lead electrically connected to the last mentioned coating, and an electrically conductive substance contained within said sensitive tube, surrounding said last mentioned coating, and contacting the interior of said sensitive tube.

References Cited by the Examiner

UNITED STATES PATENTS

| | | | |
|---|---|---|---|
| 2,201,659 | 5/1940 | Young | 204—195 |
| 2,637,316 | 5/1953 | Grez | 128—2.1 |
| 2,755,243 | 7/1956 | Beckman et al. | 204—195 |
| 2,816,997 | 12/1957 | Conrad | 128—2 X |
| 2,840,069 | 6/1958 | Squire | 128—2 |
| 2,886,771 | 5/2959 | Vincent | 128—2 |
| 2,924,213 | 2/1960 | Fleck | 128—2.1 |
| 3,000,805 | 9/1961 | Carritt | 128—2 X |
| 3,049,118 | 8/1962 | Arthur | 128—2 |
| 3,060,923 | 10/1962 | Reiner | 128—2.1 |
| 3,098,813 | 7/1963 | Beebe | 128—2.1 X |

FOREIGN PATENTS

| | | |
|---|---|---|
| 1,036,539 | 8/1958 | Germany. |
| 1,090,451 | 10/1960 | Germany. |

(Other references on following page)

OTHER REFERENCES

Lillehei: "Transistor Pacemaker," page 2007 of JAMA, April 30, 1960, Lillehei article, page 2008.

Ellis et al.: "Journal of American Chem. Soc.," vol. 57, 1935, pp. 2139–2144.

Landis: "Cereal Chemistry," vol. 11, 1934, pp. 313–318.

Thompson: "Bur. of Standards Journal of Research," vol. 9, 1932, pp. 833–853.

RICHARD A. GAUDET, *Primary Examiner.*

RICHARD J. HOFFMAN, JORDAN FRANKLIN, *Examiners.*